(12) United States Patent
Templeman

(10) Patent No.: US 6,646,643 B2
(45) Date of Patent: Nov. 11, 2003

(54) USER CONTROL OF SIMULATED LOCOMOTION

(75) Inventor: James N. Templeman, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 246 days.

(21) Appl. No.: 09/755,904

(22) Filed: Jan. 5, 2001

(65) Prior Publication Data

US 2002/0089506 A1 Jul. 11, 2002

(51) Int. Cl.[7] .............................................. G06T 15/70
(52) U.S. Cl. ...................................... 345/473; 345/474
(58) Field of Search ................................ 345/473, 474, 345/156

(56) References Cited

U.S. PATENT DOCUMENTS

| | | |
|---|---|---|
| 5,524,637 A | 6/1996 | Eridkson |
| 5,563,988 A * | 10/1996 | Maes et al. .................. 345/473 |
| 5,592,401 A | 1/1997 | Kramer |
| 5,819,206 A | 10/1998 | Horton et al. |
| 5,930,741 A | 7/1999 | Kramer |
| 6,005,548 A | 12/1999 | Latypov et al. |

OTHER PUBLICATIONS

NRL '99 Review—Released for Publication Apr. 1999, Gaiter: A Locomotion Control for Distributed Simulation, J. N. Templeman, Sibert, Denbrook, Page and McCune.
IEEE VR'99 Conference Panel Presentation: Mar. 13–17, 1999, Gaiter: A New Virtual Locomotion Technique, J. N. Templeman, distributed at the day of the conference.
NRL Jubilee Poster: Jun. 17, 1998, Gaiter: A New Control for Virtual Locomotion, copies available to the general public, J.N. Templeman, Denbrook, page, McCune, Sibert.

* cited by examiner

*Primary Examiner*—Mano Padmanabhan
(74) *Attorney, Agent, or Firm*—John J. Karasek; Lawrence G. Legg

(57) ABSTRACT

A method and apparatus for interfacing locomotive 3D movements of a user to a reference in a virtual or remote environment are provided. Initially, a 3D motion of a body portion of a user is sensed as the user takes a gestural pace. This sensing includes the determining of a beginning and an end of the gestural pace taken by the user, the determining of a 3D direction characteristic of the body portion motion during the gestural pace, and the determining of a 3D extent characteristic of the body portion motion during the gestural pace. Next, a 3D direction and extent of motion in the environment corresponding to the determined direction and extent characteristics of the gestural pace is computed. Finally, the computed 3D motion is used to move the reference in the environment.

23 Claims, 1 Drawing Sheet

USER CONTROL OF SIMULATED LOCOMOTION

BACKGROUND OF THE INVENTION

The present invention relates generally to a method and apparatus for interfacing locomotive 3D movements of a user to a reference in a virtual or remote environment, and more particularly to such a method and apparatus where a gestural pace made by a user is sensed and used to move the reference in accordance with the extent, direction, and timing of the gestural pace.

A virtual environment is an array of sensory cues generated in response to a user's actions that gives the user the impression of dealing directly with a three dimensional model. Typically either a head mounted display or a surround screen display is used to present a dynamic perspective image of the visual environment as the user moves within it. The virtual environment may be synthetically generated within a computer or may involve sensory input from a remote physical location (as in tele-operations). Virtual locomotion is movement over long distances in a virtual environment which is controlled by a user remaining within a relatively small physical space.

Virtual locomotion can be used for a variety of purposes, such as: training or rehearsal in executing skills, tasks, strategies and navigation that involve moving through an environment on foot; planning activities that involve moving through a target environment; evaluating the ergonomics or aesthetics of structures designed for human habitation, or of devices intended for mobile operation; piloting remote surface vehicles; communications between people at different locations when they want to relate to each other in a way that involves locomotion; and entertainment experiences that involve moving through a virtual environment. Particular applications would include training people to perform hazardous tasks without risking bodily harm or to train soldiers in combat simulators where the soldier interacts directly with the surrounding environment which includes other members of a team.

Head based steering is widely used in virtual environment systems. It is economical because the same position tracker used to determine the user's field of view is also used to control the direction of motion. Head based steering also encourages the user to look where they are going, and the hands are free for manipulation. However, looking and moving are no longer independent, so that the user cannot turn their head to look to the side while moving without altering their path. This makes it difficult to move to a desired position in the virtual environment.

Hand based steering techniques are also widely used and determine direction either from where the arm is pointed, from where a hand-grip is pointed, or from where a finger is pointed. Hand based steering thus frees the head for looking and allows the user to move sideways relative to the head or body. However, the control mechanism interferes with manipulation, so that the hand cannot be used for other, more normal tasks. In addition, the user must remain aware of the significance of where the hand is pointed at all times.

Torso based steering frees the head for looking and the hands for manipulation, but it does not support sidestepping. While a user will typically move in the direction that the front of the torso is pointing, sometimes this is not the case. For example, a soldier aiming a rifle across his chest may prefer to advance in the direction that he is aiming.

Another steering technique is lean based steering, which has three approaches: tilting of the upper torso, shifting of weight relative to the feet, and shifting of weight relative to a platform. All three approaches provide hands-free operation and can support sidestepping. However, the tilting of the torso approach precludes the user tilting for other purposes. The shifting of weight approach, where weight is shifted relative to the feet, is of limited use because a user cannot pace to turn.

The shifting of weight relative to a platform approach is controlled by moving the body of the user locally, relative to a central neutral position. However, when using a head-mounted display, the user easily loses track of where he stands with respect to the neutral position although the direction and rate of optical flow provides one indication of where the user is situated. A set of elastic straps attached to a ring around the user's waist gives haptic feedback, pushing the user back towards the neutral position. However, with the directional coordinate frame relative to a fixed external point in space, this is an unnatural condition that makes turning of the body and controlling the direction of motion even more independent than they are with natural locomotion. For example, the user may choose to move in one direction and then turn to face in another, making it as easy to move backwards as forwards. This approach is also incompatible with physical locomotion because velocity is controlled by the relative position of the body.

Speed of movement in a virtual environment can be controlled by using finger pressure for hand based systems, by the degree of leaning for lean based systems, by the rate at which a user paces in place, or by the degree of leg movement when the user paces in place. Often a pair of binary switches attached to a hand control are used to invoke either forward or backward virtual motion. This widely used technique is easy and inexpensive to implement. The use of such hand controls is advantageous as they work independently of head, torso and leg movements, and are thus compatible with a wide range of physical motions. However, use of hand controls for speed interferes with use of the fingers for manipulative tasks which are becoming more desired and common, especially in combat systems where the user needs to hold and aim a weapon. Another disadvantage is that when head-mounted displays are used, the user cannot see his hands or how the fingers touch the buttons, limiting the number of buttons the user can deal with.

Another speed control system was based on detecting the gesture of walking in place. A six degree of freedom magnetic sensor was attached to a head mounted display in order to track the user's head motion so that a computer could recognize walking in place versus other activity such as turning one's head or bending at the waist. Head based steering was also used so that the head tracker fully controlled virtual locomotion. While useful, this system did not allow a user to walk in one direction and look in another direction.

A number of mechanical systems have also been disclosed. One such system uses the sliding motion of the feet to indicate walking. In this system, the user wears sandals with low friction film on the middle of their sole and a rubber brake pad at the toe. The user thus glides on a low friction surface by pushing their waist against a hoop that surrounds the user and sliding his feet. A position sensor attached to each ankle and contact sensors on the bottom of each foot allow the system to recognize the length and direction of each pace and hence to specify movement in the virtual environment. However, the placement of a hoop at waist level does not allow a user to hold an object such as a rifle by their side.

Another mechanical system utilizes an omni-directional treadmill and allows the user to walk in any direction. The treadmill consists of a pair of conveyor belts nested one insider the other, with each belt mounted horizontally and perpendicular to each other. The outer belt has rollers so that it can transmit the motion produced by the inner belt, so that motion in any horizontal direction can be made. An associated control is used to keep the user centered in the middle of the platform. This system allows a user to walk in a straight line in any direction and to accelerate in that direction. However, turning while accelerating can lead to a misalignment between the user's direction of translation and the centering motion of the controller, causing a loss of balance. Even turning in place can be difficult because the controller registers the motion and compensates for it by moving the surface under the user's feet. Another problem is that a user can decelerate very quickly, coming to a full stop in a single pace or by redirecting their motion while walking fast. The user normally perceives linear and angular acceleration using their vestibular system, which leads to perceptual conflicts when using this system and which thus makes its use difficult.

A foot based locomotion system has been developed by the Army Research Institute in Orlando, Fla. Forward virtual motion is triggered by the lifting of the foot above a vertical threshold. Steering is effected by the horizontal orientation of a magnetic tracker worn on the back of the user between the shoulder blades. Thus, the user is able to effect virtual displacement while turning in place. To move backwards, one foot is placed or slid behind the other a predefined distance, with both feet flat on the floor. However, this system is disadvantageous as it does not allow use of a normal pace or gait, or of a side pace.

It will thus be appreciated that the ability to realistically simulate walking around in a virtual environment is a key element missing from the prior art systems presently available.

BRIEF SUMMARY OF THE INVENTION

In accordance with the present invention, a method and apparatus for interfacing locomotive three dimensional (hereafter 3D) movements of a user to a reference in a virtual or remote environment are provided. Initially, a 3D motion of a body portion of a user is sensed as the user takes a gestural pace. This sensing includes the determining of a beginning and an end of the gestural pace taken by the user, the determining of a 3D direction characteristic of the body portion motion during the gestural pace, and the determining of a 3D extent characteristic of the body portion motion during the gestural pace. Next, a 3D direction and extent of motion in the virtual environment corresponding to the determined direction and extent characteristics of the gestural pace is computed. Finally, the computed 3D motion is used to move the reference in the environment.

Preferably, the body portion sensed is a part of a leg of the user. More preferably, the body portion sensed is a knee of the user. Then, the determining a 3D direction characteristic includes a measuring of an initial horizontal motion of the knee to a maximum displacement thereof, and a measuring of a return horizontal motion of the knee from a maximum displacement thereof.

In a preferred embodiment, the determining the beginning and end of a pace includes a step of measuring a force exerted by a foot of the user on a base such that the gestural pace begins when the measured force first starts to diminish, given that this decline leads to the force falling below a threshold, and ends when the measured force either reaches a plateau, beyond the force threshold, or bears a selected proportion (such as one half) of the weight of user. The force threshold setting is dependent on the weight of the fully equipped user, and the tightness with which the force sensors are held in contact with the user's foot.

Also in a preferred embodiment, the computing step (a) computes the direction of motion in the environment to be equal to the determined direction characteristic, and (b) computes the extent of motion in the environment to be a multiple of the determined extent characteristic. To do this, the determining of the 3D extent characteristic step includes a step of measuring a rocking motion of the knee of the user during the gestural pace.

In the preferred embodiment, the reference in the environment includes a point of view. Then, the method further includes the steps of determining changes to an orientation of a second body portion of the user associated with a point of view of the user, and moving the point of view of the reference in the environment to match the determined changes of the point of view of the user. Preferably, the determining changes to an orientation of a second body portion determines changes to a head of the user.

The method and apparatus of the present invention preferably also includes the sensing of a 3D motion of a body portion of a user as the user takes an actual pace, including the steps of determining a beginning and an end of the actual pace taken by the user, determining a 3D direction of the body portion motion during the actual pace, and determining a 3D extent of the body portion motion during the actual pace. Then the determined direction and extent of the actual pace is used to likewise move the reference in the environment. The step of distinguishing between an actual pace and a gestural pace is preferably made by determining an extent of a return motion of the knee of the user.

It is an object of the present invention to provide a control for maneuvering through virtual environments as naturally as possible.

It is also an object of the present invention to provide a great deal of compatibility with other natural actions by having the user turn in the virtual environment by physically turning their body.

It is a further object of the present invention to allow other sorts of postural movements like bending at the waist or crouching down.

It is still a further object of the present invention to allow virtual locomotion to be intermixed with natural locomotion.

It is an advantage that the equipment needed for the apparatus is relatively compact (compared to other systems) and potentially inexpensive.

Other features, objects and advantages of the present invention are stated in or apparent from detailed descriptions of presently preferred embodiments of the invention found hereinbelow.

DETAILED DESCRIPTION OF THE INVENTION

Figure 1:
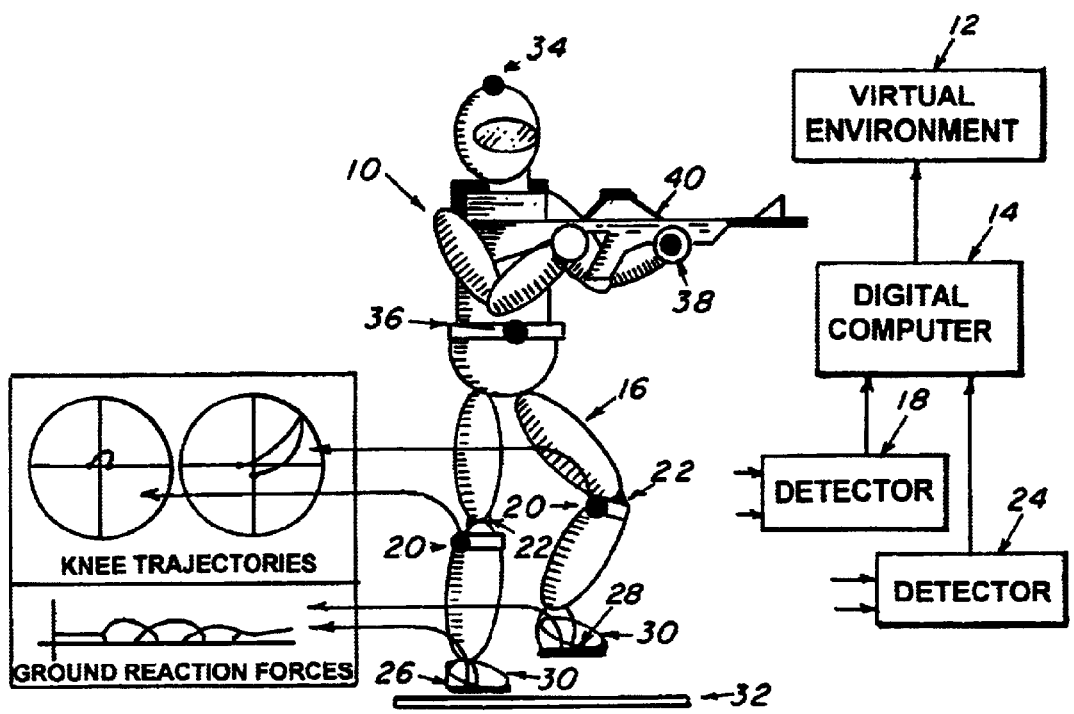
FIG. 1 is a schematic representation of the interfacing of a gestural pace with a virtual environment.

With reference now to the drawing in which like numbers represent like elements, the apparatus for interfacing locomotive 3D movements of a user 10 to a reference (or reference-point, point-of correspondence, virtual-reference-point, motion-control-point, etc.) in a display of a virtual or remote environment 12 is schematically illustrated in FIG. 1. It will be appreciated that the term virtual environment is used hereafter to refer both to a computer or the like generated virtual environment as well as to an actual environment which is remotely displayed to the user (as in the case of a vehicle operated remotely by a user). It will also be appreciated that the term "pace" is used herein to refer to a what is more commonly referred to as a "step" or the like, including walking and running steps, so as to avoid confusion with the "steps" (actions) of the method of the invention.

The term "a reference" as used herein, e.g. "a reference in a virtual environment or remote environment", means a position, e.g. a virtual spatial location definable by x-y-z-type 3D coordinates within a virtual environment, establishing an associated alignment in the virtual environment related to a user's physical motions as are further described herein. The virtual environment reference may be associated with different physical spatial parameters, including but not limited to a user's viewpoint, a part of a user's body or depiction thereof, or an object depicted in the virtual environment, such as a rifle, which may be associated with a physical prop that itself may be motion-tracked. The term "a reference", however, does not in every instance require a physical counterpart, since an object, e.g. a hand grenade, can be simulated, such as with a user simulating holding the grenade or other object without actually holding a physical prop. More than one "reference" may be maintained and applied by the system at the same time, as is the case when several different parts of the user's body are tracked and represented in virtual environment.

In performing the method of the present invention, it will be appreciated that the control technique is divided into two parts: the control action made by user 10 and the controlled effect (of the controlled action) produced by a computer 14 in the virtual environment. Since the control technique is used to mimic an action performed in the real world, there is a corresponding natural action and natural effect. For virtual locomotion, the natural action is perambulation (walking, running, sidestepping, etc.), the natural effect is real motion (physical displacement), and the controlled effect is virtual motion. In addition, locomotion control is divided into two components: control over the direction of motion (steering) and the rate of motion (speed control). With natural locomotion, steering is achieved by (a) displacing the body in any direction relative to the body's (pelvic girdle) orientation (e.g., forward, side or back pacing), (b) turning the body, or (c) a combination of displacing and turning.

It will also be appreciated that the present invention is designed to provide a control for maneuvering through virtual environments as naturally as possible. In particular, this object is achieved by making the control action (a) similar to the natural action of the user with respect to the action's intrinsic properties (parts of the body involved in motion, constraints on movements, etc.), (b) the components thereof interact with each other in the same ways the components (steering and speed control) of the natural locomotion interact, (c) interact with other actions (looking (directing both the head and eyes), manipulation (typically involving the hands, such as when a rifle is pointed), posturing (moving of body parts for other than looking, manipulation and locomotion), and thinking (i.e., cognitive load) in a manner similar to the way natural locomotion interacts with other actions (e.g., freeing the hands for manipulation and allowing a normal level of coordinated head, arm, and leg movements), and (d) have an effect similar to the natural effect (i.e., the rate and precision of movement should match).

It will further be appreciated that the present invention is designed to provide a great deal of compatibility with other natural actions by having the user turn in the virtual environment by physically turning the body. This allows actions like turning the head, pointing the hand, or wielding a weapon to be performed as a natural coordinated motion. It also allows the reflexive orientation a person might have towards or away from a stimulus to be used effectively (e.g., turning one's head to view a source of an unexpected sound). Another advantage of using the natural action of turning is to avoid a potential sensory conflict. People sense turning through their visual, aural, haptic, and vestibular systems. This builds up a sense of orientation in an environment through the temporal integration of this information. This vestibular sense of motion contributes to the user's ability to navigate through virtual environments.

For this reason, the present invention incorporates the natural action and effect of turning the body directly into the virtual locomotion control, without altering the way turning is performed. Although this eliminates the need for special actions to control turning, it imposes the constraint of having the control action be compatible with physical turning. User 10 should be able to perform virtual locomotion while turning, and the path traversed should vary accordingly. In addition, as turning of the body is not the only way of achieving steering with natural locomotion, the present invention also supports moving of the user 10 with side, diagonal and back pacing.

The present invention also allows other sorts of postural movements like bending at the waist or crouching down in case a user might want to bend to look around a corner, or crouch to hide behind an embankment. Such actions do not interfere with virtual locomotion. The present invention also allows virtual locomotion to be intermixed with natural locomotion. Thus, with the present invention, the user can move forward in the virtual environment by making control actions (gestural paces) or by taking an actual pace (though the number of paces is effectively limited to be over only a short range).

With the above objects in mind, it will be appreciated that the present method and apparatus control virtual motion by monitoring gestural motions of the legs 16 of user 10. Thus virtual motion is indicated by excess motion of the legs 16 while pacing in place or by extra leg motion added to paces that turn or displace user 10. As a result, as user 10 walks in place, the reference in the virtual environment walks or moves similarly in the virtual environment. Pattern recognition software in computer 14 is used to distinguish between in place paces, paces to turn, displaced paces, and combinations of these. The software preferably also recognizes actual paces of user 10 to move the reference similarly in the virtual environment, but obviously only a limited number of actual paces will be permitted and movement over long distances will require gestural paces.

In order to interface the locomotive 3D movement of user 10 to the virtual environment, sensing of the 3D motion of the body portion as user 10 takes a gestural (or actual) pace is made. This is accomplished by use of detector 18 which senses movement of six degree of freedom trackers 20 attached to knees 22 of user 10, and by use of detector 24 which senses forces exerted on force sensors 26 and 28 located on shoe insoles under the ball and heel of each foot 30 of user 10. Gesture detection is first begun by determining when a pace begins and ends, using detector 24 and force sensors 26 and 28. Then, the direction and extent of the leg motion (or more particularly the knee motion) is made using detector 18 and trackers 20. Computer 14 uses the detected characteristics and the pattern recognition software to compute a direction and extent of virtual displacement occurring over the course of the gestural (or actual) pace. The computed results are then used to move the reference in the virtual environment.

The ability to characterize a pace both temporally in terms of a starting and ending of a pace and spatially in terms of a leg motion allows for an accurate segmentation of the leg motion. This facilitates using the direction of excess leg motion to control the direction of virtual motion, and for the transfer of the characteristics of the pace (cadence and displacement) to be presented as motion of the reference in the virtual environment.

With the present invention, the use of a start and end of a pace (in any direction) allows computer 14 to ignore leg (knee) motions which occur when a pace is not being taken, and thus to determine the position of the leg (knee) only at the start and end of a pace. In operation, detector 24 is used in conjunction with force sensors 26 and 28 which sense force of the foot thereon to detect when the force under one foot 30 begins to (continuously) diminish as part of the sequence of the lifting of the weight supported by the foot 30 off the floor 32. A pace then ends when the force under that foot either reaches a plateau, beyond the force threshold, or bears a selected proportion of the weight of user 10, which in a preferred embodiment is about one-half. This can be measured either in terms of contact forces, or in terms of distribution of the body with respect to the floor.

Consider, for example, a man weighing 200 lbs. (with clothing, boots, and gear). He might start out from a stance in which 80 lbs. is supported by his right foot and 120 lbs. is supported by his left foot. He then starts lifting the weight of the right foot and proceeds to lift the foot up off the floor. Let us say that the contact threshold for ensuring contact with the floor is set at 5 lbs. In this case, the virtual locomotion system considers the pace to start the moment the weight supported by the right foot starts decreasing below 80 lbs., given that this weight continues to decrease to the contact threshold of 5 lbs. If the weight supported by the right foot either levels off or starts to increase, then that sequence does not lead to a pace being taken, and the system starts looking for the next decease in weight supported by either leg.

In one prototype embodiment, trackers 20 were Polhemus 3SPACE FASTRAK electromagnetic trackers attached to a strap under each knee. Another prototype used a wireless MotionStar® magnetic tracking system from Ascension Technology. Such trackers provide dynamic, real time six degree of freedom measurements. In another embodiment, optical trackers are more preferably used having a greater level of precision, i.e., sub-millimeter positional accuracy, such as the Vicon 524 Real Time motion capture system manufactured by Vicon Motion Systems. Such systems would allow all of the major segments of the body (head, torso, pelvis, and limb segments) to be tracked, so that a full-body avatar could be presented, while the translation of its center-of-mass is controlled by the virtual locomotion system. Also in the prototype embodiment, force sensors 26 and 28 were variable resistors attached under the ball and heel sections of an insole shoe insert to measure the distribution of force under both feet. A force threshold was set, on an individual user basis, to determine when contact is made between the foot and the floor. This scheme thus allows the measurement of the shifting of weight between the feet as well, so that weight distribution and ground contact are used to determine when a pace begins and ends. Obviously, other force sensors could also be used for sensing these events, and other means could be employed for detecting when parts of the foot make and break contact with the floor and the shifting of weight between the feet.

In order to effect the interface of the leg motion to the reference, the characteristics of the leg motion must be determined. To do this, physical leg movement which is used to control virtual movement is considered as including two components: primary leg motion which contributes to the physical displacement or turning of user 10, and excess leg motion which does not.

It may be difficult to capture the full motion sequence of all parts of the legs of user 10 as a pace is taken (depending on the motion tracking technology used), so that is why only some representative part such as knees 20 are tracked and used to characterize the entire leg motion. Preferably, it is the motion of knees 20 which are tracked, as shown in the inset of FIG. 1. By using this knee motion, during a pace (from start to end) as shown, the direction and extent of excess knee motion is determined.

Figures 2A, 2B, 2C:
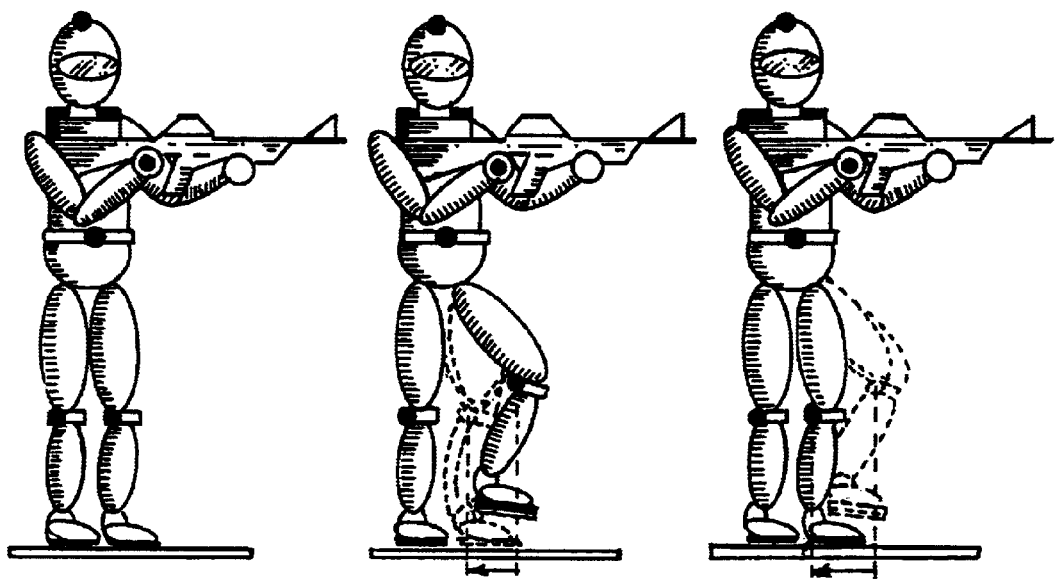
FIGS. 2a–c are schematic representations of the starting position, knee excursion portion and knee reversal portion, respectively, of a forward gestural pace.

While the initial movement of the knee from start (FIG. 2a) to a maximum (FIG. 2b) could be used, it is the preferred embodiment to measure the reverse horizontal motion of the raised knee (FIG. 2c) as this is negligible for an actual pace, allowing discriminating therebetween easily by computer 14. This measurement is made in terms of the projection of the knee's location onto floor 32, or the horizontal axis as shown in the inset of FIG. 1. Knee 22 starts to reverse its motion when the horizontal distance between the position of knee 22 at the start of the pace and the current location begins to decrease. Thus, knee reversal for a completed pace is measured as a vector from the point at which knee 22 of raised leg 16 achieves a maximum distance from the location thereof at the start of the pace to the location of knee 22 at the end of the pace. As the determination of the gestural pace is made at the beginning of the reverse motion, there is some time lag between the beginning of the forward gestural motion and movement in the virtual environment. However, this is only a relatively minor delay, and is almost unnoticeable by the user when a series of gestural paces are taken.

Another way of distinguish between an actual and a gestural pace is to examine the cumulative motion of the pelvis. Obviously, when the user paces in place, the pelvis does not move very far from its initial position (over the course of a single pace; they may drift a short distance). There are many other characteristics of walking and running motions that can be used to discriminate between actual and a gestural paces.

It will be appreciated that in natural locomotion paces are typically taken in series and not as a single unit. As a result, a pace is typically defined in terms of one leg swinging from a position extending behind a user to its extension in front of the user. However, when a user starts walking from rest with both feet together, and stops by bringing both feet together, the initial and terminating paces are actually half-paces. Thus, computer 14 should also recognize such initial and terminal paces and apply this to the virtual displacement in the virtual environment.

Computer 14 can thus convert any gestural pace in any direction by detecting the rocking of leg 16 (or knee 22). Forward virtual motion is simply achieved by user 10 by pacing in place so that knees 22 rock forward and then backward (see FIGS. 2*a*–*c*). To take a virtual side pace to the right, user 10 simply lifts his right knee 22 up to the right and then drops it back down to the original location (to the left); while on alternate paces, left knee 22 is raised and lowered but not rocked horizontally (or the left knee may remain lowered). Backward virtual paces are taken by rocking knees 22 backward first and then forward into the original place. User 10 can also rock knees 22 along a diagonal path to move in that diagonal direction as well. In all cases, the direction and degree of virtual motion is determined by the direction and degree with which knee 22 moves. Preferably, as noted above, the direction traveled by the knee during its outward swing and the distance traveled when it reverses direction and swings back to the starting point. Both the excursion (outward swing) and reversal (inward swing) of the knee are excess leg motions during an in-place pace, since they generate no physical displacement of the body. It will thus be appreciated that virtual displacement is a function of both how far knees 22 swing and the pacing rate, just as physical displacement is a function of both stride length and pacing rate.

The horizontal motion of knee 22 measured during a gestural pace is less than that which would occur during a physical pace. Therefore, computer 14 preferably computes the extent of motion in the virtual environment as a multiple of the horizontal motion detected. A ratio of four times the distance of knee 22 reversal is the presently preferred multiple used for the extent of motion of the virtual pace while walking in place. However, this ratio could be altered as desired, for example for different styles of gait and individual differences, as well as to simulate stairs, grades/inclines, and various types of terrain. Of course, the direction of motion detected is the actual motion of user 10, so that computer 14 passes the direction component directly to the virtual pace.

For a series of paces, computer 14 determines the pacing state of each leg. At any point in time, each leg is in one of three phases: down (D), excursion (X) or reversal (R). Tracking both feet (Left/Right) 30, a normal series of paces would produce the pattern D/D, D/X, D/D, X/D, DD . . . ; while a normal series of gestural paces would produce the pattern D/D, D/X, D/R, D/D, X/D, R/D, D/D, . . . . In a running pace, the phase periods overlap as there is a period in which both feet 30 are up simultaneously and no period when both feet 30 are down simultaneously. Thus, an actual running would produce the pattern D/D, D/X, X/S, S/D, S/S, D/X, . . . ; while a gestural running would produce the pattern D/D, D/X, D/R, X/R, S/D, R/D, R/X, D/X, D/R, . . . It will be appreciated that there are no X/X or R/R patterns, so that jumping is always detected as a physical movement.

While gestural pacing is the primary mechanism by which virtual motion takes place, it will be appreciated that actual paces (both in direction and distance) of user 10 can also be detected and effected as a virtual motion. In an actual (or hybrid) pace, user 10 physically moves in the direction of knee 22 movement, but there is little (if any, or unequal for a hybrid pace) reverse motion of knee 22 so that it is easy to discriminate between an actual pace and a pace in place. Where such actual paces are detected by computer 14, the direction and distance are directly (one-to-one) converted by computer 14 into a virtual pace. Obviously, the number or extend of such actual paces is limited, but it can be relatively extensive if desired.

Steps may generate a combination of physical and virtual displacement. In general:

Physical Leg Motion=Primary Leg Motion+Excess Leg Motion.

Thus, primary leg motion generates physical displacement of the body and is dominant in actual steps, whereas excess leg motion is dominant for in-place steps. When tracking the motion of the knee, hybrid steps are evident when the distances covered by the outward and reverse swings of the knee are unequal. The position at any point in time of the user's body in the virtual environment is its physical position offset by the accumulated virtual displacement:

Virtual Position=Physical Position+Virtual Displacement

Actual steps update the physical position but do not alter the virtual displacement; in-place steps update the virtual displacement but not the physical position. In each case the virtual position is altered, so the virtual body moves through the virtual environment. The virtual displacement is added to each (physically tracked) part of the user's body to translate him in the virtual environment. The virtual position of the waist, head, and hands are all computed in this manner, while their orientations are tracked directly. Visually representing the position and orientation of the avatar's legs in the virtual environment is more difficult, since a physical in-place step must be transformed into a translational step in the virtual environment.

In the preferred embodiment, a head sensor 34 and waist sensor 36 (or other body segment, including the pelvis, upper and lower torso, shoulders, upper and lower arms, and even fingers) are also respectively used to track the physical position and orientation of the view point and central body of user 10. To minimize viewing lag, the virtual displacement computed from gestural pacing is combined with the sensed position at the head to generate the virtual reference position in the virtual environment. Head sensor 34 enables the viewpoint to move independently, yet remain linked to the body position of user 10. Since the head and body share the same virtual displacement, they remain attached and move as parts of user 10 through the virtual environment. The virtual position and orientation of the body as determined by head sensor 34 and waist sensor 36 can be used in collision detection. A sensor mounted on the hand 38 is also used where it is desired to track the movement and pointing of the hand.

Preferably, head sensor 34 is part of a head mounted display, such as a V8 model from Virtual Research Corporation which thus provides the point of view in a virtual environment. However, another approach with obvious attractiveness is to use a surround screen display for user 10.

Virtual locomotion is most simply used to control motion of the view point of user 10 through a virtual (or remotely produced) environment, but the virtual locomotion of the present invention can also be used to control the animation of an articulated representation of a user's virtual or remote "body". Thus, while the present invention has been primarily focused on the movement of the pelvis, it could be used only for the viewpoint or more expansively to the movement of various body parts.

With the present invention, it will thus be appreciated that many realistic features are achieved by the use of leg motion to control action as follows:

a) The user can virtually walk around freely in the virtual environment; either forward, backward, sideways or diagonally without turning the body and in particular in directions other than that at which the pelvis is pointed.

b) The user moves in the appropriate coordinate frame-of-reference following the direction of knee motion. Other parts of the body of the user (head, shoulders, arms, pelvis, etc.) can be aligned as they are in natural postures and movements. This allows the user to make use of his reflexes to direct his body in response to external stimuli.

c) The user utilizes only the parts of the body normally associated with walking, so that the user is not unnaturally constrained and so that actions performed by other parts of the body of the user are not interfered with. The user is free to turn his head to look in any direction and is free to use his hands to manipulate and point at virtual objects. The user is also able to naturally intermix a wide range of postural motions, such as crouching, jumping, and bending to look around objects, with the gestural pacing motions. In addition, since the user makes excess leg motions to control walking, such excess leg motions are discriminated from paces or pivots to turn the user's body. Neither pacing to turn or pivoting produce extra motion in the virtual environment, beyond that of the direct motion. In fact, excess leg motion can be combined with turning paces to allow the user to traverse a curved path in the virtual environment, while an actual displaced pace moves the point of view in the virtual environment by the same amount and in the same direction as the actual pace.

d) The gestural knee motion is easy for the user to make with confidence, as it is simply walking in place.

e) The pattern recognition system does not have to wait for a gesture to be complete before responding to knee movements, so that virtual motions is made in response to both actual and gestural paces as the pace is taken.

f) The attributes of in place pacing are used to control the characteristics of the pace portrayed in the virtual environment. The horizontal extent and frequency of in place paces are easily mapped into stride length and cadences of the paces taken by the virtual reference or body. The system can also be tuned to preserve metrics between physical and virtual space, as well as to match specific attributes of natural locomotion such as perceived velocity and foot clearance (above a virtual obstacle).

g) Tying optic flow of the reference point directly to leg movement makes the system interface feel like a simulation of walking rather than an indirect control over locomotion. It thus comes close to creating the interactive illusion of virtual perambulation, since the cadence of the pacing movements is reflected in what the user sees. This may facilitate skill learning in a wide variety of tasks that involve locomotion. The reduction in sensory mismatch also reduces the tendency for motion sickness.

By allowing the user to control direction, extent, and rate of their virtual movement by using the user's leg in a similar way and with a similar body centric coordinate system to natural locomotion, the system: (a) is easy to learn, because the motions are made as they would be in natural locomotion; (b) makes the user's virtual motions more similar to their natural locomotion; (c) allows the user to adopt movement strategies in the virtual environment which are similar to those which would apply in the real world; and (d) allows the skills practiced in the virtual environment to transfer more readily to real world situations.

While the present invention has been described using the motion of the knee of the user during a gestural pace to determine motion in a virtual environment, other parts of the body of the user can be used. For example, the forward and reverse rotation (pitch) of the thigh during a pace could be used. During a real pace, the thigh of the raised leg pitches forward while the thigh of the support leg pitches back. During the excursion phase of a pace in place, the thigh of the raised leg pitches forward, while the thigh of the support leg remains upright.

There are also many ways to characterize the direction of knee movement, such as by the movement of the shank or thigh, the center of mass of the entire leg or segments thereof, or indirectly by noting movements of the remainder of the body besides the raised leg during a pace.

There are also other ways of measuring the motion of the knee of the user relative to its location at the start of a pace. Rather than in terms of a projection onto the ground, the movement of the knee could be measured as an absolute Euclidean distance. The movement could also be estimated relative to the movement of the pelvis or other leg, or relative to vertical displacement achieved. Both of these latter schemes would provide a quicker response as detecting of a pace could be made during the excursion phase prior to a knee reversal.

While the use of trackers and force sensors attached to the body of the user have been discussed above, it will also be appreciated that other ways of detecting movement of the knee (or other body portion) and beginning/end of a pace are possible. For example, contact of the foot can be detected by measuring the distance between various parts of the foot and the floor or ground plane, with a negligible distance being equal to contact having been made. Also, force measurements can be made from the floor. Other measurements are also possible, such as sound, or any energy passing between the foot and floor (capacitance, electrical potential, etc.). Similarly, trackers could be placed anywhere on the leg, or remote sensors used to directly view and detect movement of the knee or other leg portion (especially the ankle joint). Multiple position and orientation sensors for each leg could also be used for even greater accuracy, but this leads to complexity, added costs, and added computation time.

Thus, while the present invention has been described with respect to exemplary embodiments thereof, it will be understood by those of ordinary skill in the art that variations and modifications can be effected within the scope and spirit of the invention.

What is claimed is:

1. A method for interfacing locomotive 3D movements of a user to a reference in a virtual or remote environment comprising the steps of:

sensing a 3D motion of a body portion of a user as the user takes a gestural pace, said sensing step including the steps of
determining a beginning and an end of the gestural pace taken by the user,
determining a 3D direction characteristic of an initial horizontal motion of the body portion during the gestural pace, and
determining a 3D extent characteristic of a return horizontal motion of the body portion during the gestural pace;
computing a 3D direction and extent of motion in the environment corresponding to the determined direction and extent characteristics of the gestural pace; and
using the computed 3D motion to move the reference in the environment.

2. A method for interfacing locomotive 3D movements of a user as claimed in claim 1, wherein the body portion sensed during said sensing step is a part of a leg of the user.

3. A method for interfacing locomotive 3D movements of a user as claimed in claim 2, wherein the body portion sensed during said sensing step is a knee of the user.

4. A method for interfacing locomotive 3D movements of a user as claimed in claim 3, wherein said determining a 3D direction characteristic step includes a step of measuring an initial horizontal motion of the knee to a maximum displacement thereof.

5. A method for interfacing locomotive 3D movements of a user as claimed in claim 3, wherein said determining a 3D extent characteristic step includes a step of measuring a return horizontal motion of the knee from a maximum displacement thereof.

6. A method for interfacing locomotive 3D movements of a user as claimed in claim 1, wherein said determining a beginning and an end step includes a step of measuring a force exerted by a foot of the user on a base such that the gestural pace begins when the measured force first starts to diminish, given that this decline leads to the measured force falling below a threshold, and the gestural pace ends when the measured force reaches one of a plateau, beyond the force threshold, or bears a selected proportion of the weight of user.

7. A method for interfacing locomotive 3D movements of a user as claimed in claim 6, wherein said selected proportion of the weight of user is about one half.

8. A method for interfacing locomotive 3D movements of a user as claimed in claim 1, wherein said computing step (a) computes the direction of motion in the environment to be equal to the determined direction characteristic, and (b) computes the extent of motion in the environment to be a multiple of the determined extent characteristic.

9. A method for interfacing locomotive 3D movements of a user as claimed in claim 7, wherein said determining of the 3D extent characteristic step includes a step of measuring a rocking motion of the knee of the user during the gestural pace.

10. A method for interfacing locomotive 3D movements of a user as claimed in claim 8, wherein the multiple of the determined extent characteristic is four.

11. A method for interfacing locomotive 3D movements of a user as claimed in claim 1:
wherein the reference in the environment includes a point of view; and
further including the steps of:
determining changes to an orientation of a second body portion of the user associated with a point of view of the user, and
moving the point of view of the reference in the environment to match the determined changes of the point of view of the user.

12. A method for interfacing locomotive 3D movements of a user as claimed in claim 11, wherein said determining changes to an orientation of a second body portion determines changes to a head of the user.

13. A method for interfacing locomotive 3D movements of a user as claimed in claim 1, further including the steps of:
sensing a 3D motion of a body portion of a user as the user takes an actual pace, said sensing of the actual pace step including the steps of
determining a beginning and an end of the actual pace taken by the user,
determining a 3D direction of the body portion motion during the actual pace, and
determining a 3D extent of the body portion motion during the actual pace; and
using the determined direction and extent of the actual pace to likewise move the reference in the environment.

14. A method for interfacing locomotive 3D movements of a user as claimed in claim 13, and further including the step of distinguishing between an actual pace and a gestural pace by determining an extent of a return motion of the knee of the user.

15. A method for interfacing locomotive 3D movements of a user to a reference in a virtual or remote environment comprising the steps of:
sensing a 3D motion of a knee of a user as the user takes a gestural pace, said sensing step including the steps of
determining a beginning and an end of the gestural pace taken by the user,
determining a 3D direction characteristic of an initial horizontal motion of the knee during the gestural pace, and
determining a 3D extent characteristic of a return horizontal motion of the knee during the gestural pace;
computing a 3D direction and extent of motion in the environment corresponding to the determined direction and extent characteristics of the gestural pace; and
using the computed 3D motion to move the reference in the environment.

16. A method for interfacing locomotive 3D movements of a user as claimed in claim 15:
wherein said determining a 3D direction characteristic step includes a step of measuring an initial horizontal motion of the knee to a maximum displacement thereof; and
wherein said determining a 3D extent characteristic step includes a step of measuring a return horizontal motion of the knee from a maximum displacement thereof.

17. A method for interfacing locomotive 3D movements of a user as claimed in claim 16, wherein said computing step (a) computes the direction of motion in the environment to be equal to the determined direction characteristic, and (b) computes the extent of motion in the environment to be a multiple of the determined extent characteristic.

18. A method for interfacing locomotive 3D movements of a user as claimed in claim 17:
wherein the reference in the environment includes a point of view; and
further including the steps of:
determining changes to an orientation of a second body portion of the user associated with a point of view of the user, and
moving the point of view of the reference in the environment to match the determined changes of the point of view of the user.

19. A method for interfacing locomotive 3D movements of a user as claimed in claim 18, wherein said step of determining changes to an orientation of a second body portion determines changes to a head of the user.

20. A method for interfacing locomotive 3D movements of a user as claimed in claim 19, further including the steps of:
sensing a 3D motion of a knee of a user as the user takes an actual pace, said sensing of the actual pace step including the steps of
determining a beginning and an end of the actual pace taken by the user,
determining a 3D direction of the knee motion during the actual pace, and
determining a 3D extent of the knee motion during the actual pace; and
using the determined direction and extent of the actual pace to likewise move the reference in the environment.

21. A method for interfacing locomotive 3D movements of a user as claimed in claim 20, and further including the step of distinguishing between an actual pace and a gestural pace by determining an extent of a return motion of the knee of the user.

22. A method for interfacing locomotive 3D movements of a user as claimed in claim 17, wherein the multiple of the determined extent characteristic is about four.

23. An apparatus for interfacing locomotive 3D movements of a user to a reference in a virtual or remote environment comprising:

a sensing system which senses a 3D motion of a body portion of a user as the user takes a gestural pace, said sensing system including a first means for determining a beginning and an end of the gestural pace taken by the user, a second means for determining a 3D direction characteristic of an initial horizontal motion of the body portion during the gestural pace, and a third means for determining a 3D extent characteristic of a return horizontal motion of the body portion during the gestural pace;

a computer which computes a 3D direction and extent of motion in the environment corresponding to the determined direction and extent characteristics of the gestural pace; and an interface which uses the computed 3D motion to move the reference in the environment.

\* \* \* \* \*